(12) United States Patent
Ohwada

(10) Patent No.: US 7,672,646 B2
(45) Date of Patent: Mar. 2, 2010

(54) BASE STATION AND MOBILE COMMUNICATION SYSTEM UTILIZING THE SAME

(75) Inventor: Hideki Ohwada, Tokyo (JP)

(73) Assignee: NEC Corporation (JP)

( * ) Notice: Subject to any disclaimer, the term of this patent is extended or adjusted under 35 U.S.C. 154(b) by 1463 days.

(21) Appl. No.: 10/502,481

(22) PCT Filed: Jan. 23, 2003

(86) PCT No.: PCT/JP03/00589

§ 371 (c)(1), (2), (4) Date: Jul. 23, 2004

(87) PCT Pub. No.: WO03/063389

PCT Pub. Date: Jul. 31, 2003

(65) Prior Publication Data

US 2005/0083881 A1  Apr. 21, 2005

(30) Foreign Application Priority Data

Jan. 23, 2002 (JP) ............................ 2002-013624

(51) Int. Cl.
*H03C 7/02* (2006.01)

(52) U.S. Cl. .................. 455/101; 455/562.1; 455/442; 455/561; 455/67.11; 370/342; 370/335; 370/331

(58) Field of Classification Search ................. 455/442, 455/561, 562.1, 522, 69, 436, 67.13, 101; 370/331, 333, 342; 375/267
See application file for complete search history.

(56) References Cited

U.S. PATENT DOCUMENTS 3,693,088 A * 9/1972 Rustako et al. .............. 455/506

| | | | | |
|---|---|---|---|---|
| 5,280,631 A | * | 1/1994 | Nakahi et al. ................. 455/65 |
| 5,737,327 A | * | 4/1998 | Ling et al. ................... 370/335 |
| 5,805,583 A | * | 9/1998 | Rakib .......................... 370/342 |
| 5,812,935 A | * | 9/1998 | Kay ............................. 370/333 |
| 5,873,027 A | * | 2/1999 | Asano et al. ............. 455/67.13 |
| 5,884,173 A | * | 3/1999 | Sollner ....................... 455/436 |
| RE36,591 E | * | 2/2000 | Hayashi et al. ............. 370/342 |
| 6,035,218 A | * | 3/2000 | Oh et al. .................. 455/562.1 |

(Continued)

FOREIGN PATENT DOCUMENTS

JP  9-312885  12/1997

(Continued)

*Primary Examiner*—Sharad Rampuria
(74) *Attorney, Agent, or Firm*—Hayes Soloway P.C.

(57) ABSTRACT

A hardware is used to perform an SSDT processing, thereby avoiding performance degradation than otherwise would occur due to load increase caused by a software processing, and thereby realizing a base station that can instantaneously perform a transmission control and provide a high speed site selection. In order to perform a site selection diversity power control (SSDT) for the purpose of reducing the amount of interference that would be caused by transmitting the same data to a plurality of cells or antennas during soft-handover, an encode processing part (1) is used to add a transmission control bit to the transmitted data. In response to this transmission control bit, a transmission control signal selecting circuit (206) selects a transmission control signal of destination. An output control circuit (207) receives, as its inputs, a transmission spread signal and the transmission control signal to perform an output control and instantaneously perform a transmission control, thereby realizing a high-speed site selection.

10 Claims, 9 Drawing Sheets

U.S. PATENT DOCUMENTS

| | | | |
|---|---|---|---|
| 6,055,415 A * | 4/2000 | Suzuki | 455/69 |
| 6,131,016 A * | 10/2000 | Greenstein et al. | 455/69 |
| 6,236,866 B1 * | 5/2001 | Meyer et al. | 455/562.1 |
| 6,373,832 B1 * | 4/2002 | Huang et al. | 370/342 |
| 6,434,135 B1 * | 8/2002 | Ozluturk et al. | 370/342 |
| 6,477,161 B1 * | 11/2002 | Hudson et al. | 370/342 |
| 6,526,028 B1 * | 2/2003 | Kondo | 370/333 |
| 6,526,291 B1 * | 2/2003 | Ekstrom et al. | 455/562.1 |
| 6,529,496 B1 * | 3/2003 | Yeom et al. | 370/345 |
| 6,594,473 B1 * | 7/2003 | Dabak et al. | 455/101 |
| 6,614,950 B2 * | 9/2003 | Huang et al. | 385/15 |
| 6,785,558 B1 * | 8/2004 | Stratford et al. | 455/561 |
| 6,834,043 B1 * | 12/2004 | Vook et al. | 370/310 |
| 6,862,275 B1 * | 3/2005 | Dabak | 370/342 |
| 7,058,407 B2 * | 6/2006 | Chi et al. | 455/449 |
| 7,095,727 B2 * | 8/2006 | Kim et al. | 370/335 |
| 7,149,256 B2 * | 12/2006 | Vrazel et al. | 375/295 |
| 7,280,842 B2 * | 10/2007 | Smolyar et al. | 455/525 |
| 7,539,463 B2 * | 5/2009 | Himayat et al. | 455/101 |
| 2002/0160716 A1 | 10/2002 | Hiramatsu et al. | 455/67.1 |
| 2008/0049706 A1 * | 2/2008 | Khandekar et al. | 370/342 |

FOREIGN PATENT DOCUMENTS

| | | |
|---|---|---|
| JP | 10-190616 | 7/1998 |
| JP | 11-308662 | 11/1999 |
| JP | 2000-349684 | 12/2000 |
| JP | 2001-285913 | 10/2001 |

* cited by examiner

BASE STATION AND MOBILE COMMUNICATION SYSTEM UTILIZING THE SAME

TECHNICAL FIELD

The present invention relates to a base station and a mobile communication system using the same, and particularly, relates to a CDMA (Code Division Multiple Access) communication method for performing a site selection diversity control during soft-handover that the base station having antennas corresponding to a plurality of sectors, respectively, and a mobile terminal perform communication through more than one sector.

BACKGROUND ART

According to a CDMA radio transmission method, in a cellular method dividing a service area into a plurality of cells and arranging a base station at the center of each cell, transmission is performed by dividing one cell into plural areas referred to as a sector and arranging an antenna for each sector. Upon performing so-called soft-handover that the mobile terminal performs communication through more than one sector concurrently with the base station (strictly, softer-handover is distinguished from the soft-handover performing simultaneous communication through the plural cells, however, they are not particularly distinguished from each other in this specification), the base station spreads the same symbol data simultaneously with different spread codes and transmits them from the plural antennas to each sector. This increases the amount of interference between transmission signals in each sector (or a cell) and as a result, the number of users admitted in a sector is reduced.

By performing a site selection diversity power control (SSDT: Site Selection Diversity Transmit Power Control) upon the soft-handover, it is possible to suppress the increase of the interference occurred due to transmission of the same data to the plural sectors (or cells). In addition, by the SSDT, a high-speed site selection can be performed without increasing the load of the network due to the site selection control via a network. In the SSDT, the output states of the plural antennas transmitting the same data are changed, so that it is necessary to change over the transmission state of a spreader corresponding to each antenna into the output state or the stop state.

In order to perform the high-speed site selection, it is necessary for the SSDT to change the transmission state of the spreader in units of slot or symbol. In addition, this operation is performed for each of plural spread processing parts at a transmission part. Accordingly, it is feared that the processing is delayed due to increase of the number of processing calls and a generation rate of the handover.

As an example of the configuration of a transmission spread processing part in a communication base station in a conventional CDMA method, the configuration that the number of the antenna is three is shown in FIG. 1. With reference to FIG. 1, the transmission spread processing part is configured by an encode processing part 1, a spread part 2, radio transmission processing parts 3a to 3c, and antennas 4a to 4c. The spread part 2 is configured by a data separating part 201, a CPU 202, spread processing part groups 203a to 203c, and additively combining circuits 208a to 208c.

The spread processing part group 203a has a plurality of spread processing parts having the same configurations and corresponding to users and each spread processing part is made of a spread processing circuit 205a. In addition, the spread processing part group 203b also has a plurality of spread processing parts having the same configurations and corresponding to users and each spread processing part is made of a spread processing circuit 205b. Further, the spread processing part group 203c also has a plurality of spread processing parts having the same configurations and corresponding to users and each spread processing part is made of a spread processing circuit 205c.

The encode processing part 1 generates a transmission baseband signal and transmits it to the spread part 2. The spread part 2 performs the data separation with the data separating part 201 and inputs the transmission baseband signal that is separated to the spread processing part groups 203a to 203c therein. The spread processing circuit 205a performs the spread processing of the transmission baseband signal with a spread code for a transmission destination antenna 4a that is set by the CPU 202 and outputs the transmission spread signal to the additively combining circuit 208a. The additively combining circuit 208a additively combines each transmission spread signal from a plurality of spread processing circuits 205a and provides it to the corresponding radio transmission processing part 3a.

The spread processing circuit 205b performs the spread processing of the transmission baseband signal with the spread code for a transmission destination antenna 4b that is set by the CPU 202 and outputs the transmission spread signal to the additively combining circuit 208b. The additively combining circuit 208b additively combines each transmission spread signal from a plurality of spread processing circuits 205b and provides it to the corresponding radio transmission processing part 3b. In the same way, the spread processing circuit 205c performs the spread processing of the transmission baseband signal by using the spread code for a transmission destination antenna 40 that is set by the CPU 202 and outputs the transmission spread signal to the additively combining circuit 208c. The additively combining circuit 208c additively combines each transmission spread signal from a plurality of spread processing circuits 205c and provides it to the corresponding radio transmission processing part 3c.

The radio transmission processing parts 3a to 3c perform the orthogonal modulation, the radio frequency conversion, and the transmission power control with respect to the inputted transmission spread signals, and then, transmit them to the antennas 4a to 4c, respectively, as radio transmission signals. The antennas 4a to 4c radiation transmits the inputted radio transmission signals.

Here, the output state control of the spread processing part groups 203a to 203c is performed by the software processing with the CPU 202 in such a manner that spread processing parameters such as spread codes or the like in the spread processing circuits 205a to 205c are set or unset. In order to perform the transmission output control at the designated timing, in the software processing, a counter is provided and if a counter value becomes the designated counter value, the control of the spread processing circuits 205a to 205c is performed.

The transmission spread processing part shown in FIG. 1 involves a problem such that, if the frequency of use (a rate of operation) of the spread processing part is increased due to increase of calling and increase of the handover generation rate, the delay of the SSDT processing is caused due to increase of the software processing and this makes it impossible to change over the site instantaneously.

DISCLOSURE OF THE INVENTION

The present invention has been made taking the foregoing problems into consideration and an object of which is to avoid performance degradation that occurs due to load increase caused by a software processing, to provide a base station that can instantaneous perform a transmission control and provide a high-speed site selection, and to provide a CDMA communication method using the base station.

The base station according to the present invention having a plurality of antennas corresponding to sectors, which is used in a CDMA (Code Division Multiple Access) communication system for performing a site selection diversity control during soft-handover that the base station and a mobile terminal perform communication through more than one sector. This base station is characterized by including transmission control signal generating means for adding a transmission control signal showing if the transmission can be realized or not for the above-described plural antennas to the transmission data; and transmission control means for performing on-off control of the above-described transmission data to the above-described antennas in response to this transmission control signal.

Then, the above-described transmission control signal generating means is characterized by having means for generating the above-described control signal for each symbol of the above-described transmission data, respectively, and means for time division multiplexing the above-described symbol and the above-described control signal corresponding to the above-described symbol and outputting them. In addition, the above-described transmission control signal generating means is characterized by having means for generating the above-described transmission control signal according to a receiving quality of a transmission pilot signal from each of the above-described antennas at the above-described mobile terminal. The above-described control signal is characterized by indicating that the transmission can be performed only to the antenna with the best receiving quality from among the above-described antennas and the transmission cannot be performed to other antennas.

Further, the above-described base station includes spread processing means for performing the spread processing of the above-described transmission data separately for the above-described plural antennas; characterized in that the above-described transmission control means has means for separating the above-described transmission data and the above-described transmission control signal and means for performing the output control of the above-described corresponding spread processing means in response to this separated transmission control signal for the corresponding antenna.

Further, the above-described base station further includes a plurality of spread processing means for performing the spread processing of the above-described transmission data and output destination selecting means for freely selecting the above-described antenna as the output destination of the above-described spread processing means; characterized in that the above-described transmission control means has means for separating the above-described transmission data and the above-described transmission control signal and means for performing the output control of the above-described spread processing means corresponding to the output destination that is selected by the above-described output destination selecting means in response to this separated transmission control signal for the corresponding antenna.

In addition, the CDMA mobile communication system according to the present invention is characterized by including the above-described base station.

According to the present invention, in a code division multiple access (CDMA) system using a spectrum spread technology for the radio transmission, the site selection diversity power control (SSDT) for the purpose of reducing the amount of interference that would be caused by transmitting to a plurality of cells or antennas during soft-handover is performed upon the soft-handover. In this case, the encode processing part adds the transmission control signal (bit) showing if the transmission can be realized or not for a plurality of antennas to the transmission data and transmits it to the spread processing part. The spread processing part selects the transmission control signal of the destination (antenna) in response to this transmission control signal to perform on-off control of the signal after performing the transmission spread processing to the corresponding antennas in accordance with the obtained transmission control signal. According to such a configuration, the transmission control is performed instantaneously, and this makes the high-speed site selection possible.

BEST MODE FOR CARRYING OUT THE INVENTION

Figure 1:
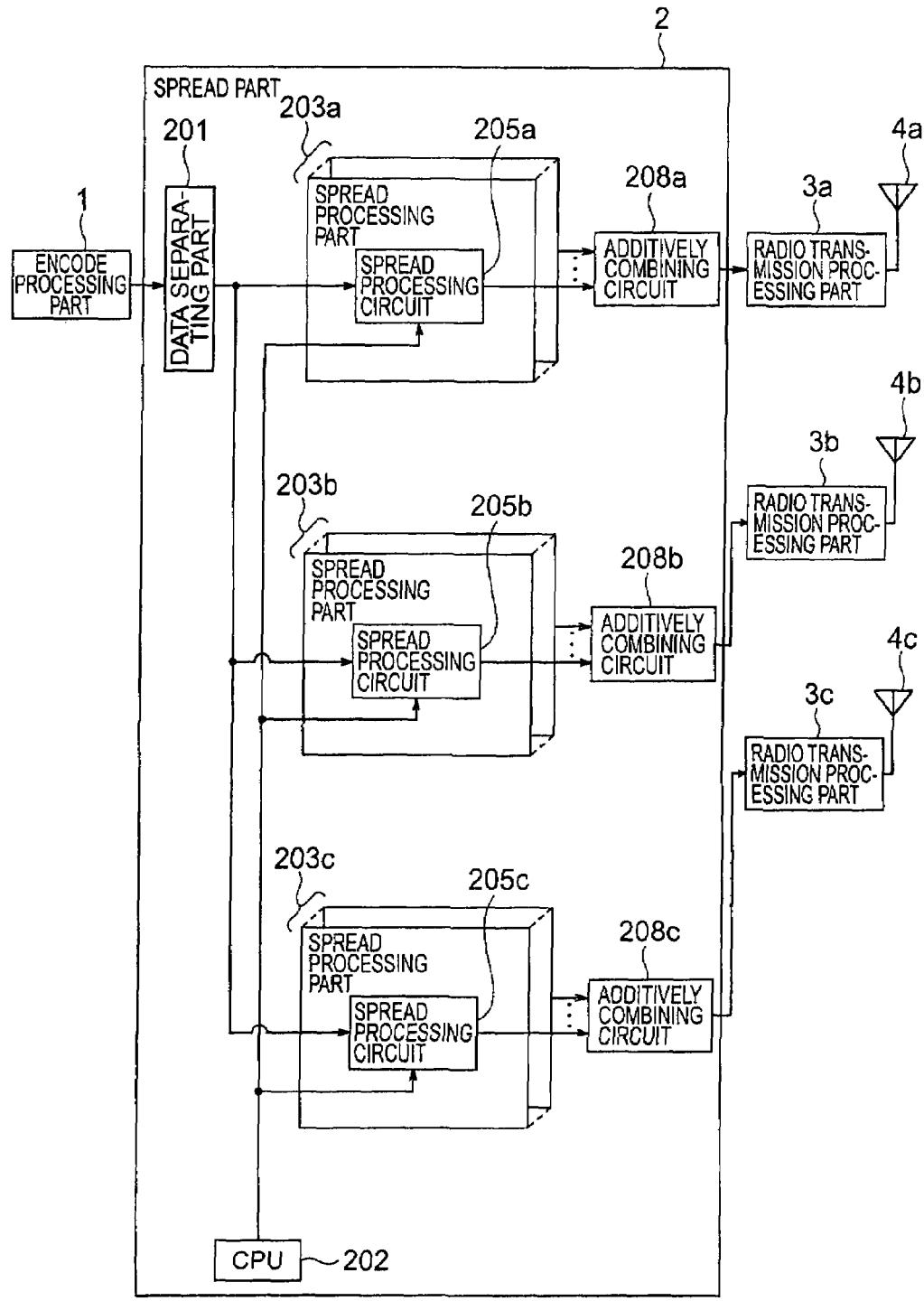
FIG. 1 is a block diagram showing an example of a transmission spread processing part at a communication base station in a conventional CDMA system.
Figure 2:
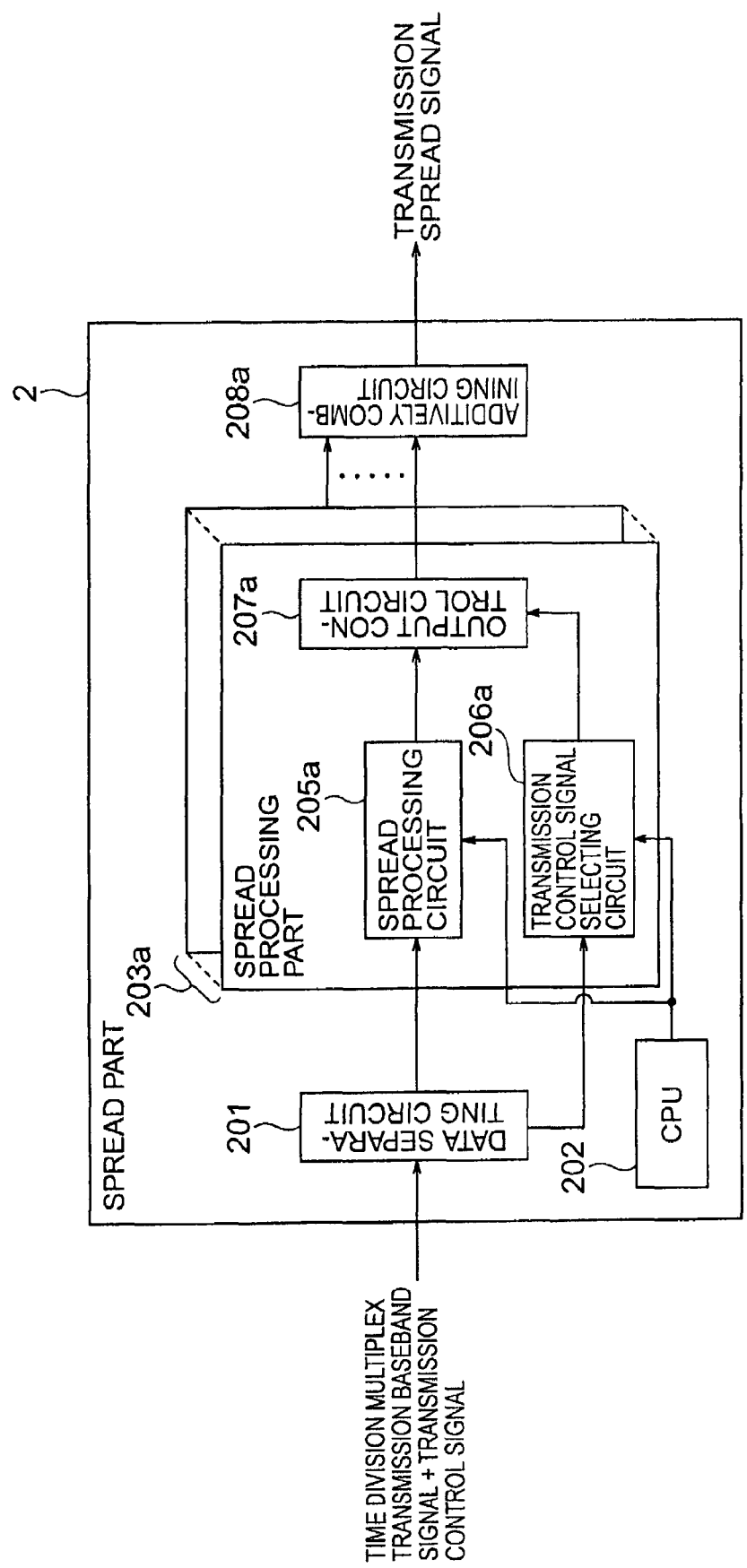
FIG. 2 is a block diagram showing a configuration of a spread part of a base station according to an embodiment of the present invention.

With reference to the drawings, the embodiments of the present invention will be described in detail. FIG. 2 is a functional block diagram showing a configuration of a spread part that is used in a base station of an embodiment according to the present invention. In FIG. 2, the same reference numerals are applied to the same parts as in FIG. 1. With reference to FIG. 2, a transmission baseband signal and a control signal are inputted in the data separating part 201, which are time division multiplexed as described later. The data separating part 201 may separate the transmission baseband signal and the transmission control signal that are inputted and time division multiplexed and may transmit them to the spread processing circuit 205a and a transmission control signal selecting circuit 206a, respectively. The spread processing circuit 205a may generate a transmission spread signal by using the spread code that is designated by the CPU 202.

The transmission control signal selecting circuit 206a extracts the transmission control signal showing if the transmission can be realized or not for the transmission destination antenna to be designated by the CPU 202 from the transmission control signal inputted and time division multiplexed and transmits it to an output control circuit 207a. The output control circuit 207a may control the output state of the transmission spread signal to be inputted from the spread processing circuit 205a to be made into the output state or the output stopping state in accordance with the transmission control signal to be inputted.

Thus, since the transmission control signal showing if the transmission can be realized or not for the transmission destination antenna is time division multiplexed into the transmission data to be supplied to the spread part 2 and the output control of the transmission spread data is controlled by using the control signal to be obtained by separating this multiplexed data, it is not necessary for the spread part 2 to perform the output control of the transmission spread signal by the software processing. In other words, it is not necessary to control the spread processing circuit 205a by the software processing. Therefore, there is no need to consider the delay of the processing of the spread processing part caused due to increase of the frequency of use of the spread processing circuit 205a. In addition, by transmitting the transmission control signal for each symbol data of the transmission baseband signal, the control of the transmission and output state for each symbol can be instantaneously realized by the hardware processing.

Figure 3:
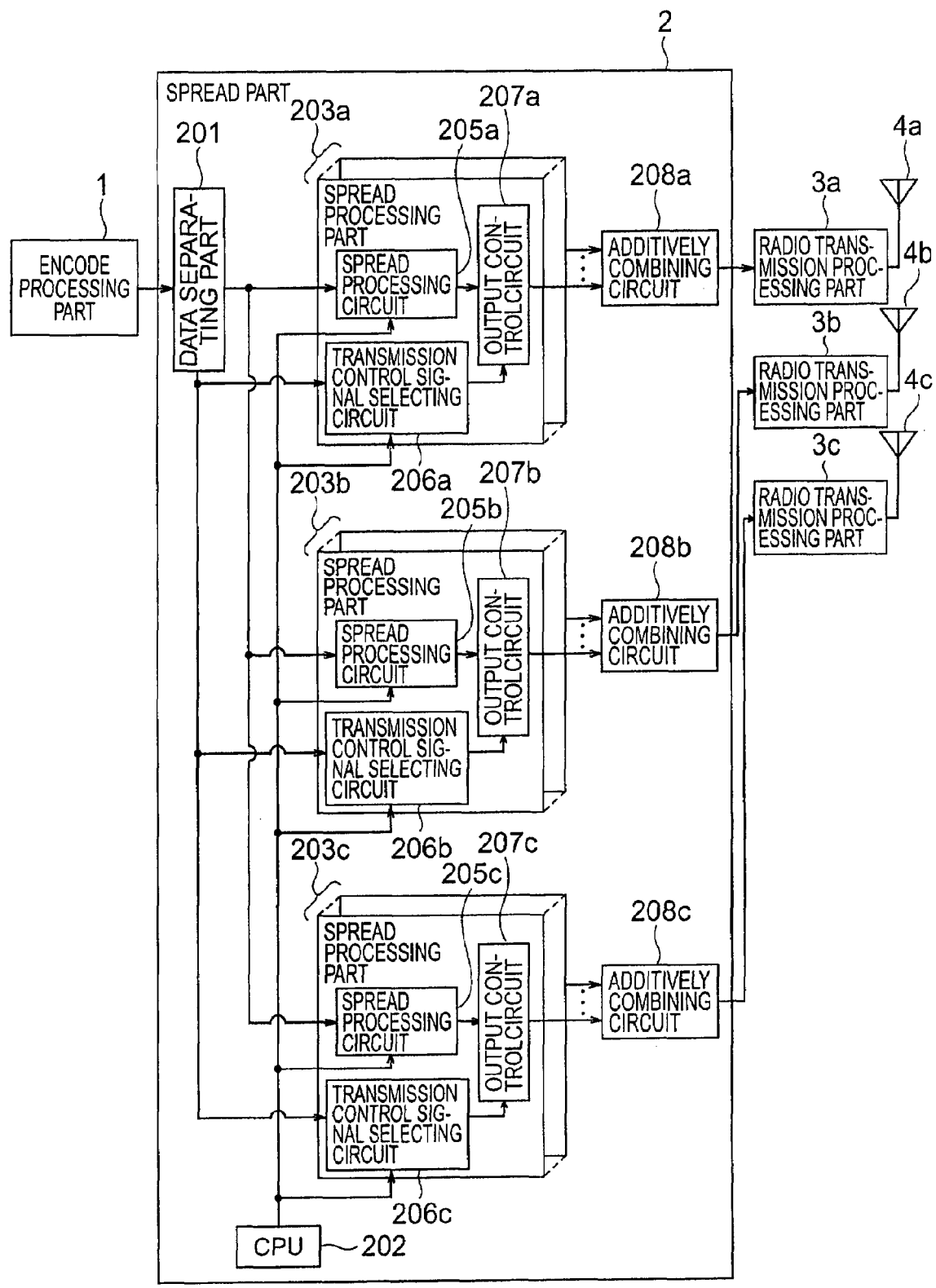
FIG. 3 is a block diagram of a transmission part of the base station according to an embodiment of the present invention.

FIG. 3 is a block diagram of an embodiment of the transmission part including the transmission spread processing circuit of the CDMA base station according to the present invention. In FIG. 3, it is illustrated that there are three antennas as the transmission destination. With reference to FIG. 3, the entire configuration will be described. This transmission part is configured by the encode processing part 1, the spread part 2, the radio transmission processing parts 3a to 3c, and the antennas 4a to 4c.

Figure 4:
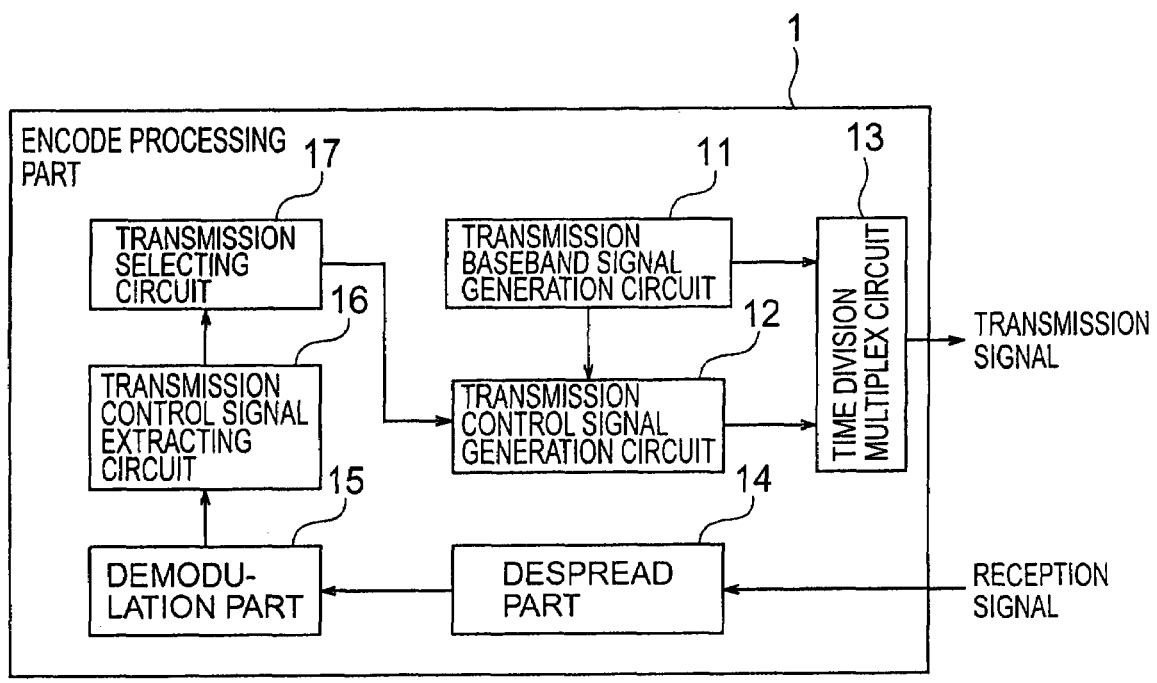
FIG. 4 is a block diagram showing a specific example of an encoding processing part that is included in the transmission part shown in FIG. 3.

The encode processing part 1 is configured as shown in FIG. 4. In other words, the encode processing part 1 is configured by a transmission baseband signal generation circuit 11, a transmission control signal generation circuit 12, a time division multiplex circuit 13, a despread part 14, a demodulation part 15, a transmission control signal extracting circuit 16, and a transmission selecting circuit 17. FIG. 4 shows an example of timing chart showing the details of the operation of this encode processing part 1.

According to the SSDT method, pilot signals that are transmitted by respective antennas 4a to 4c of the base station are received at the mobile terminal side to be demodulated so as to correspond to the antenna, and the antenna corresponding to the pilot signal to be received at the maximum power (namely, the receiving quality is the best) is decided as the site selection upon the SSDT. Therefore, the mobile terminal may include the control information indicating the antenna of which receiving quality is the best in an upward signal to the base station. The despread part 14 shown in FIG. 4 receives the upward signal from the mobile terminal and performs despread processing for this upward signal. The demodulation part 15 may demodulate the despread upward signal. The transmission control signal extracting circuit 16 may extract this control information from the demodulated upward signal.

Figure 5:
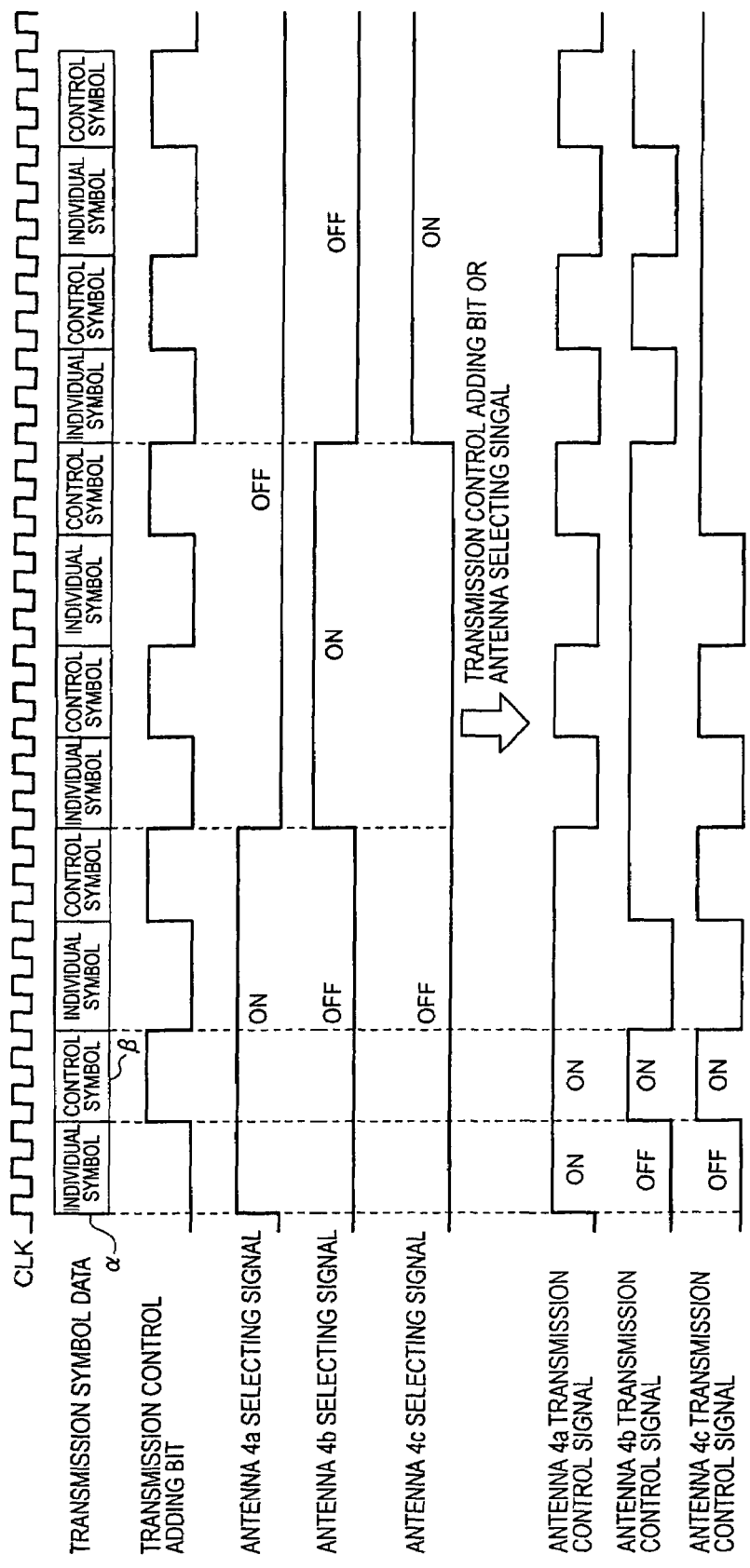
FIG. 5 is a timing chart for explaining the operation of the encoding processing part shown in FIG. 4.

This extracted control information is inputted in the transmission selecting circuit 17 and the transmission selecting circuit 17 may determine if the transmission can be realized or not in respective antennas 4a to 4c on the basis of this extracted control information. The transmission selecting circuit 17 may generate a transmission selecting signal for each antenna and transmit it to the transmission control signal generation circuit 12. As shown in the uppermost line of FIG. 5, the transmission baseband signal generation circuit 11 generates a baseband signal to be transmitted and simultaneously, generates a transmission control adding bit for each symbol data. In the meantime, the control symbols shown in FIG. 5 temporally corresponding to this transmission control adding bit (binary 1) is the information indicating a control signal (a pilot signal or the like) corresponding to "an individual symbol" just before it, respectively. In addition, when the transmission symbol is the control symbol data, the transmission control adding bit is binary 1, and when it is the individual symbol data, the transmission control adding bit is binary 0.

The transmission control adding bit thus generated is supplied to the transmission control signal generation circuit 12. The transmission control signal generation circuit 12 may implement the logical OR operation between the transmission control adding bit and the selecting signal for each antenna that is inputted from the transmission selecting circuit 17 and may generate the transmission control signal for each antenna. In the meaning, in FIG. 5, the selecting signal and the transmission control signal for each antenna indicate that the transmission is performed at its high level (the transmission ON) and that the transmission is not performed at its low level (the transmission OFF). For example, with respect to an individual symbol α shown at a left upper end of FIG. 5, the transmission control signal of the antenna 4a is ON and those of other antennas are OFF. In addition, with respect to a control symbol β corresponding to the individual symbol α, the transmission control signals of all antennas 4a to 4c are ON.

The transmission control signals thus generated are inputted in the time division multiplex circuit 13. The time division multiplex circuit 13 may parallel-serial convert the inputted transmission control signals and may time division multiplex these signals with the transmission baseband signal from the transmission baseband signal generation circuit 11. An example of the multiplexed signal in this case will be shown in FIG. 6.

Returning to FIG. 3, the spread part 2 is configured by the data separating part 201, the CPU 202, the spread processing part groups 203a to 203c, and the additively combining circuits 208a to 208c. In this case, the spread processing part group 203a may output a signal to the antenna 4a via the radio transmission processing part 3a, the spread processing part group 203b may output a signal to the antenna 4b via the radio transmission processing part 3b, and the spread processing part group 203c may output a signal to the antenna 4c via the radio transmission processing part 3c, respectively.

The spread processing part group 203a has a plurality of spread processing parts, and each spread processing part thereof is configured by the spread processing circuit 205a, the transmission control signal selecting circuit 206a, and the output control circuit 207a. The spread processing part group 203b has a plurality of spread processing parts, and each spread processing part thereof is configured by the spread processing circuit 205b, the transmission control signal selecting circuit 206b, and the output control circuit 207b. In the same way, the spread processing part group 203c has a plurality of spread processing parts, and each spread processing part thereof is configured by the spread processing circuit 205c, the transmission control signal selecting circuit 206c, and the output control circuit 207c.

Figure 6:
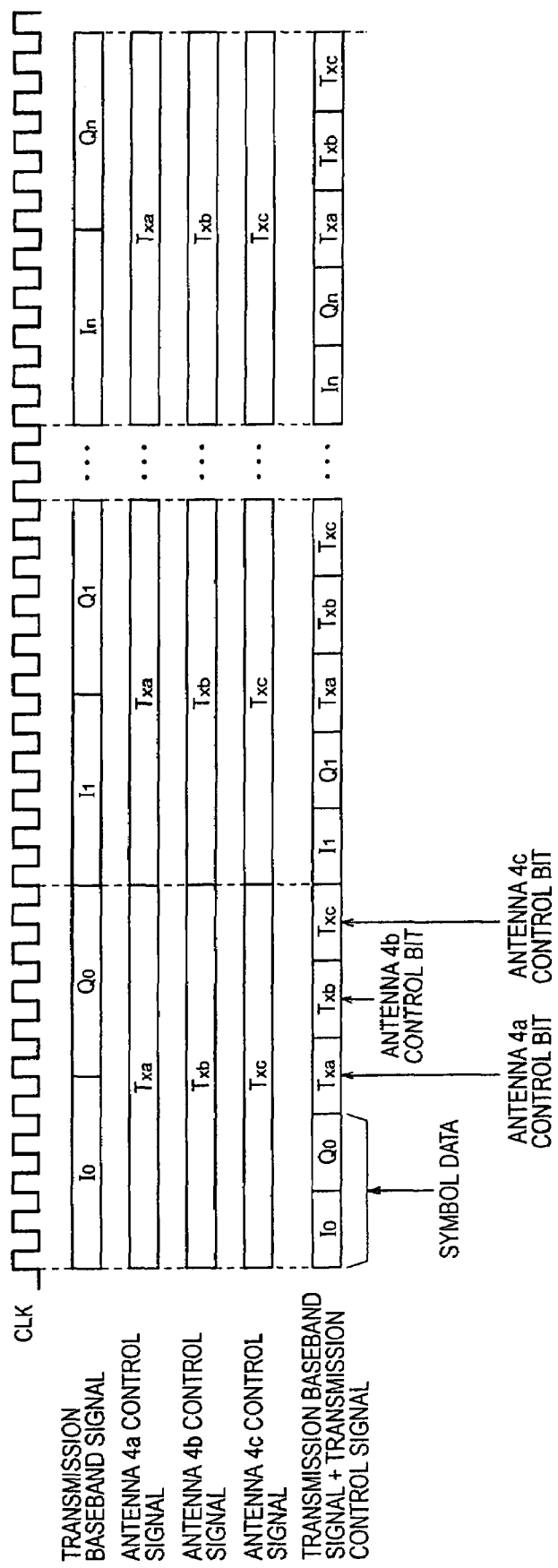
FIG. 6 is a signal format view of a signal that is used in the transmission part shown in FIG. 3.

The baseband signal and the transmission control signals multiplexed as shown in FIG. 6 are inputted in the spread part 2 by the time division multiplex circuit 13 of the encode processing part 1. The data separating part 201 of the spread part 2 may separate the time division multiplexed transmission signal to be inputted from the encode processing part 1 into the baseband signal and the transmission control signal. The separated transmission baseband signal is transmitted to the spread processing circuits 205a to 205c, and the separated transmission control signal is transmitted to the transmission control signal selecting circuits 206a to 206c, respectively.

In the spread processing circuit 205a, the spread code is set by the CPU 202 to be transmitted to the antenna 4a. The spread processing circuit 205a may perform the spread processing of the inputted transmission baseband signal by using the set spread code, and may transmit it to the output control circuit 207a. The transmission control signal selecting circuit 206a is set so as to correspond to the antenna 4a by the CPU 202. The transmission control signal selecting circuit 206a may select and separate the transmission control signal for the antenna 4a from the inputted transmission control signal, and then, may output it to the output control circuit 207a. The output control circuit 207a is changed into the output possible state or the output stopping state in accordance with the transmission control signal to be inputted. This state change is carried out in symbol units of the transmission spread signal to be inputted. The transmission spread signal is outputted from the output control circuit 207a to be transmitted to the additively combining circuit 208a.

In addition, similarly, in the spread processing circuit 205b, the spread code is set by the CPU 202 to be transmitted to the antenna 4b. The spread processing circuit 205b may perform the spread processing of the inputted transmission baseband signal by using the set spread code, and may transmit it to the output control circuit 207b. The transmission control signal selecting circuit 206b is set so as to correspond to the antenna 4b by the CPU 202. The transmission control signal selecting circuit 206b may select and separate the transmission control signal for the antenna 4b from the inputted transmission control signal, and then, may output it to the output control circuit 207b. The output control circuit 207b is changed into the output possible state or the output stopping state in accordance with the transmission control signal to be inputted. This state change is carried out in symbol units of the transmission spread signal to be inputted. The transmission spread signal is outputted from the output control circuit 207b to be transmitted to the additively combining circuit 208b.

Further, similarly in the spread processing circuit 205c, the spread code is set by the CPU 202 to be transmitted to the antenna 4c. The spread processing circuit 205c may perform the spread processing of the inputted transmission baseband signal by using the set spread code, and may transmit it to the output control circuit 207c. The transmission control signal selecting circuit 206c is set so as to correspond to the antenna 4c by the CPU 202. The transmission control signal selecting circuit 206c may select and separate the transmission control signal for the antenna 4c from the inputted transmission control signal, and then, may output it to the output control circuit 207c. The output control circuit 207c is changed into the output possible state or the output stopping state in accordance with the transmission control signal to be inputted. This state change is carried out in symbol units of the transmission spread signal to be inputted. The transmission spread signal is outputted from the output control circuit 207c to be transmitted to the additively combining circuit 208c.

The additively combining circuits 208a to 208c may add and combine the transmission spread signals to be inputted from the spread processing part groups 203a to 203c, respectively, for each of the transmission destination antennas 4a to 4c and may transmit the added and combined transmission spread signals to the radio transmission processing parts 3a to 3c that are connected to respective transmission destination antennas 4a to 4c. The radio transmission processing parts 3a to 3c perform the orthogonal modulation, the radio frequency conversion, and the transmission power control with respect to the inputted transmission spread signals, and then, transmits it to the corresponding antennas 4a to 4c, respectively, as radio transmission signals. The antennas 4a to 4c radiation transmit the inputted radio transmission signals.

In the next place, the operation changing the transmission destination antenna only into the antenna 4a (the transmission can be performed only for the antenna 4a and it cannot be performed for other antennas) in the circuit configuration shown in FIG. 3 will be described. The encode processing part 1 may generate a transmission control signal such that the antenna 4a is put in the transmission ON state and the antenna 4b and 4c are put in the transmission OFF state in the transmission control signal generation circuit 12. The time division multiplex circuit 13 may time division multiplex the transmission baseband signal to be generated by the transmission baseband signal generation circuit 11 with the transmission control signal for each symbol and may transmit it to the spread part 2.

The spread processing part groups 203a to 203c individually corresponding to transmission destination antennas 4a to 4c may perform the spread processing for the transmission baseband signal that is separated by the data separating part 201 by means of the spread code designated by the CPU 202 for the transmission destination antennas 4a to 4c. The transmission control signal separated by the data separating part 201 is inputted in the transmission control signal selecting circuits 206a to 206c.

The spread processing circuit 205a may perform the spread processing for the transmission baseband signal by using the spread code set by the CPU 202 for the antenna 4a and may transmit it to the output control circuit 207a. The transmission control signal selecting circuit 206a outputs the transmission control signal (the ON signal) for the antenna 4a to the output control circuit 207a. Thereby, the output control circuit 207a may output the transmission spread signal to the additively combining circuit 208a.

The spread processing circuit 205b may perform the spread processing for the transmission baseband signal by using the spread code set by the CPU 202 for the antenna 4b and may transmit it to the output control circuit 207b. The transmission control signal selecting circuit 206b outputs the transmission control signal (the OFF signal) for the antenna 4b to the output control circuit 207b. Thereby, the output control circuit 207b is put in the output stopping state and may stop the output of the transmission spread signal to the additively combining circuit 208b.

In the same way, the spread processing circuit 205c may perform the spread processing for the transmission baseband signal by using the spread code set by the CPU 202 for the antenna 4c and may transmit it to the output control circuit 207c. The transmission control signal selecting circuit 206c outputs the transmission control signal (the OFF signal) for the antenna 4c to the output control circuit 207c. Thereby, the output control circuit 207c is put in the output stopping state and may stop the output of the transmission spread signal to the additively combining circuit 208c.

Figure 7:
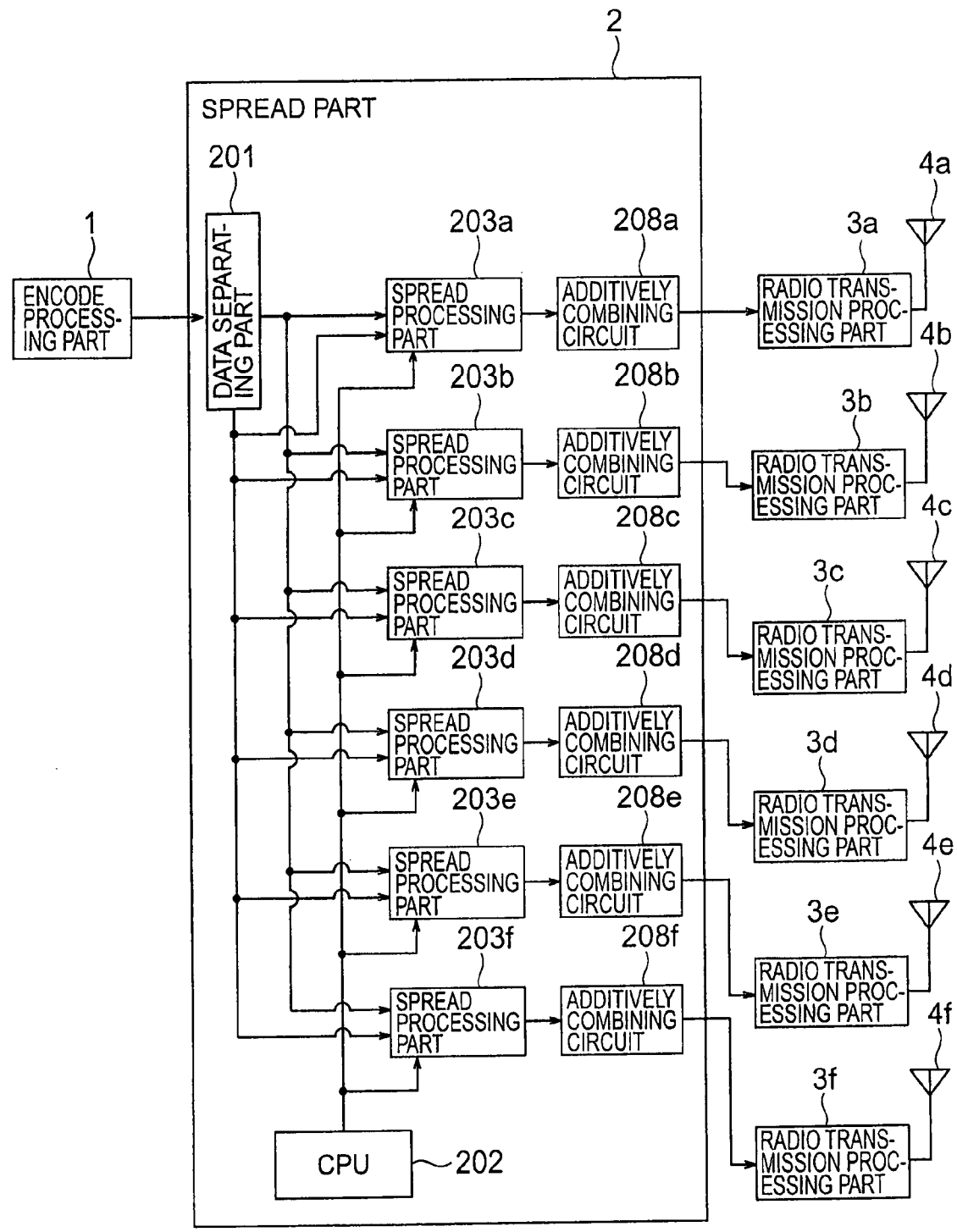
FIG. 7 is a block diagram of the transmission part of the base station according to other embodiment of the present invention.

In the next place, other embodiment of the present invention will be described with reference to FIG. 7. In FIG. 7, the same reference numerals are applied to the same parts as in FIG. 2 and FIG. 3. With reference to FIG. 7, the base station of the present embodiment is provided with six radio transmission processing parts 3a to 3f, and six antennas 4a to 4f. In other words, in the transmission part of the base station shown in FIG. 7, the example of six transmission destination antennas is indicated. In this transmission part, the encode processing part 1 may generate a control signal for the six antennas. The transmission baseband signal to be inputted in the time division multiplex circuit 13 of the encode processing part 1 and the transmission control signal are time division multiplexed into a signal format shown in FIG. 8 to be transmitted to the spread part 2.

Figure 8:
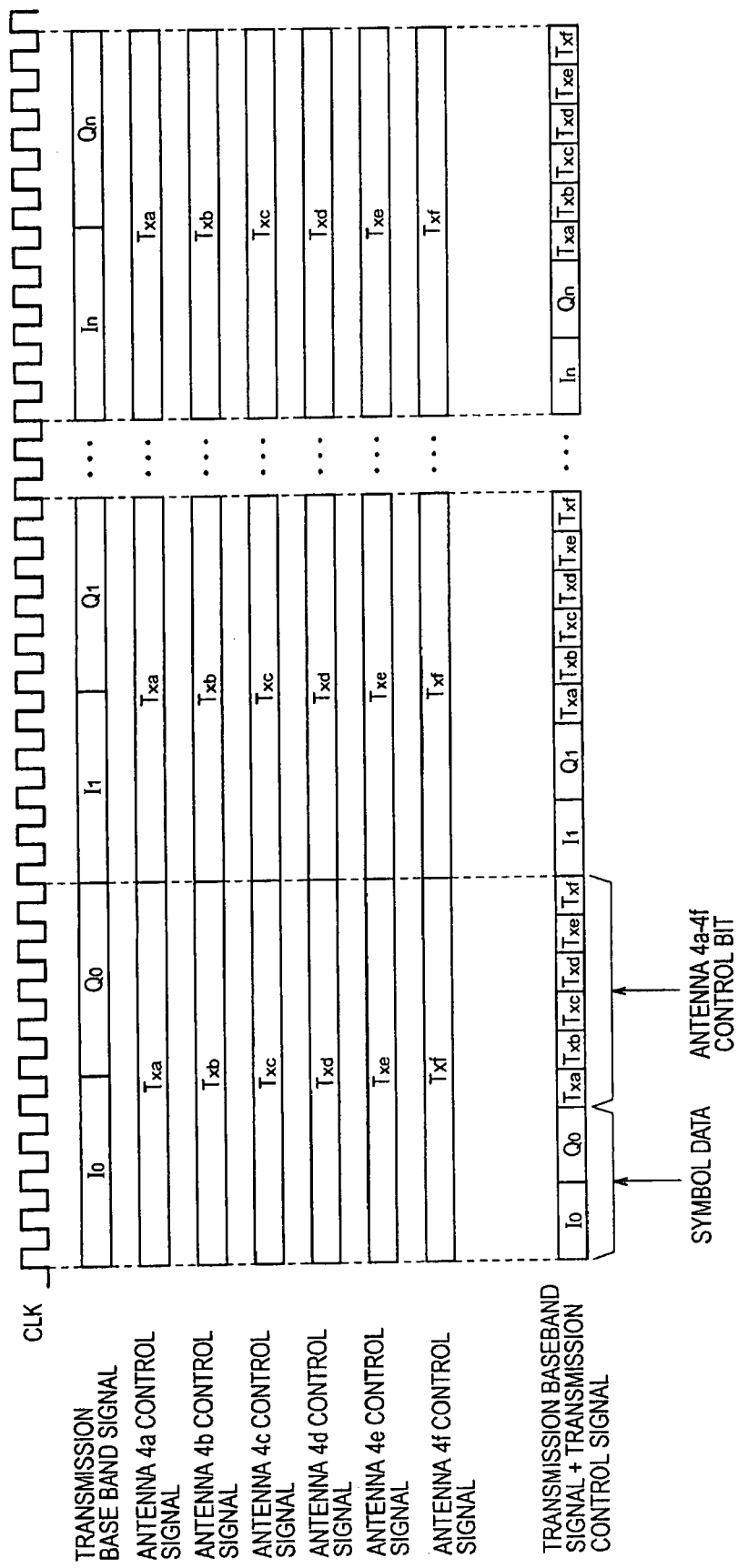
FIG. 8 is a signal format view of a signal that is used in the transmission part shown in FIG. 7.

In the spread part 2, the spread processing part groups 203a to 203f and the additively combining circuits 208a to 208f are provided as accessible to the six antennas 4a to 4f, respectively. As shown in FIG. 8, since the signal format is configured so as to correspond to the six antennas, the transmission part according to the present embodiment has a new advantage such that the number of the transmission destination antenna is changed from one to six in accordance with the transmission state of each base station.

Figure 9:
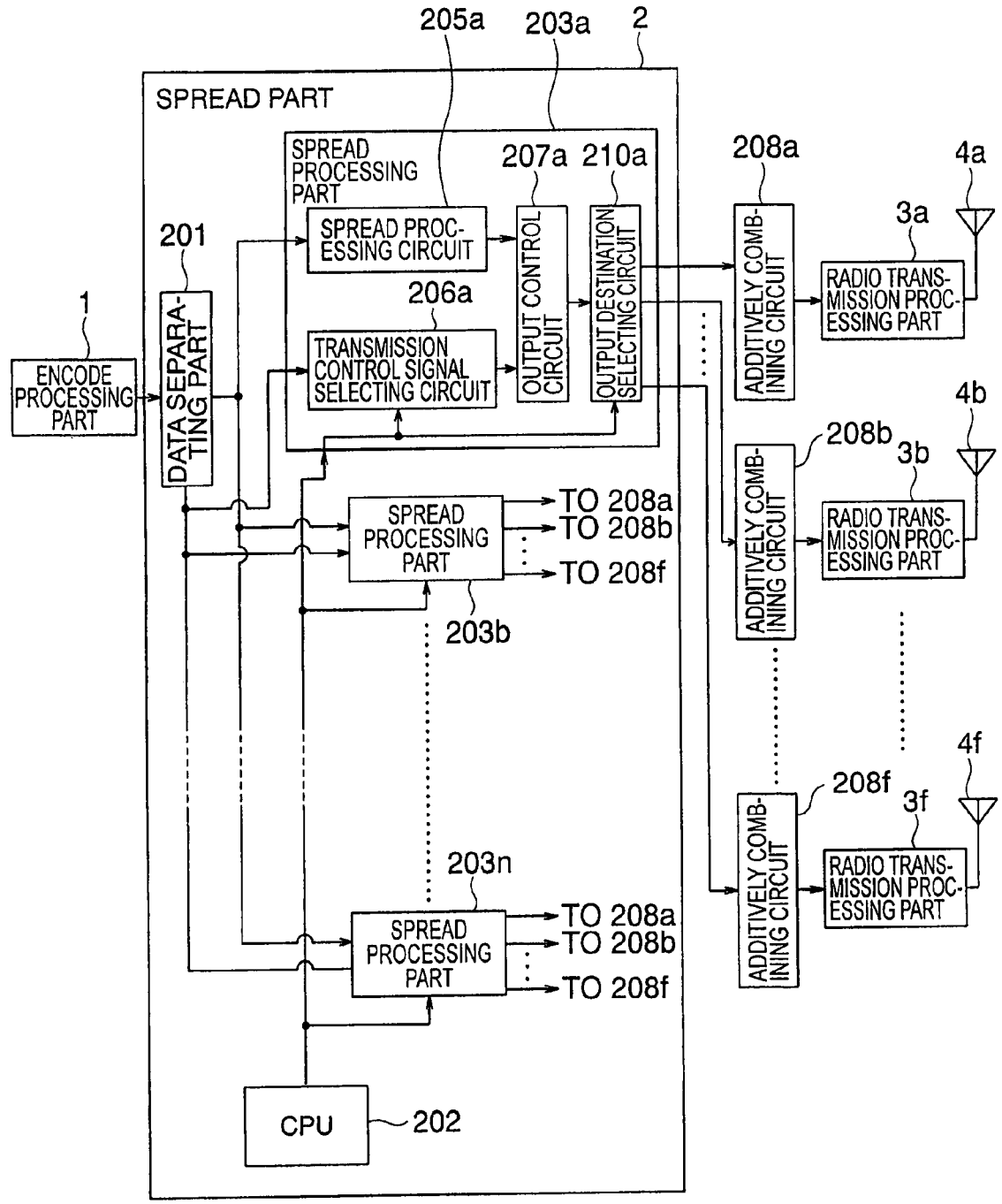
FIG. 9 is a block diagram of the transmission part of the base station according to further other embodiment of the present invention.

In the next place, further other embodiment according to the present invention will be described with reference to FIG. 9. In FIG. 9, the same reference numerals are applied to the same parts as in FIG. 2, FIG. 3, and FIG. 7. With reference to FIG. 9, the transmission part according to the present embodiment is configured such that output destination selecting circuits 210a to 210n are added between respective output control circuits 207a to 207n and additively combining circuits 208a to 208f within n pieces of spread processing part groups 203a to 203n, respectively.

In the meantime, in FIG. 9, functional blocks in the spread processing part 203a are only shown for simplification, however, other spread processing parts 203b to 203n are configured in the same way. In other words, the spread processing parts 203b to 203n are provided with the output destination selecting circuits 210a to 210n, respectively. These output destination selecting circuits 210a to 210n are controlled by the CPU 22.

In addition, in the transmission part according to the present embodiment, the additively combining circuits 208a to 208f and the radio transmission processing parts 3a to 3c are provided as accessible to the antennas 4a to 4f, respectively. Since the transmission destination antenna is designated to the output destination selecting circuits 210a to 210n by the CPU 202, the output destination selecting circuits 210a to 210n time division multiplexes the transmission spread signals to be inputted from output control circuits 207a to 207n for each transmission destination antenna and transmits them to respective additively combining circuits 208a to 208f.

The additively combining circuits 208a to 208f adds and combines the transmission spread signals to be inputted from the spread processing parts 203b to 203n for each of transmission destination antennas 4a to 4f. Since the output destination selecting circuits 210a to 210n are provided, the transmission part according to the present embodiment is not connected fixedly to any one of the transmission destination antennas 4a to 4f but can be randomly connected to them, so that the present embodiment has a new advantage capable of selecting the transmission destination flexibly.

INDUSTRIAL APPLICABILITY

According to the present invention, since the control of the transmission state of the spread processing part is performed by the hardware processing, the high-speed site selection can be changed over in units of slot or symbol. In the case of the software processing for providing a counter and performing the control of the transmission state according to the counter value, the processing is delayed due to increase of the number of processing calls and this leads to the case that the output control cannot be realized instantaneously. On the contrary, the present configuration to perform the control by the hardware processing that is designed in consideration of control timing in advance is more excellent.

In addition, conventionally, if the number of the spread processing parts is increased, the load of the software processing is increased and the performance degradation of the SSDT processing is occurred. However, according to the present invention, the performance degradation of the SSDT processing can be avoided by performing the hardware processing. If the number of the spread processing parts for the transmission baseband signal is increased, as the processing, to generate the control signal in the encoding processing part is easier than to perform the transmission state control of the spread part by the software processing and this leads to reduce the load of the software processing in the spread processing circuit.

The invention claimed is:

1. A base station having a plurality of antennas corresponding to sectors, which is used in a CDMA (Code Division Multiple Access) communication system for performing a site selection diversity control during soft-handover that the base station and a mobile terminal perform communication through more than one sector,
    said base station comprising a transmission control signal generator for adding a transmission control signal showing if the transmission can be realized or not for said plural antennas to the transmission data; and
    a transmission controller for performing on-off control of said transmission data to said antennas in response to said transmission control signal,
    wherein said transmission control signal generator generates said control signal for each symbol of said transmission data, respectively, and includes a multiplexer for time division multiplexing said symbol and said control signal corresponding to said symbol and outputting them.

2. The base station according to claim 1, wherein said transmission control signal generator generates said transmission control signal according to a receiving quality of a transmission pilot signal from each of said antennas at said mobile terminal.

3. The base station according to claim 2, wherein said control signal indicates that the transmission can be performed only to the antenna with the best receiving quality from among said antennas and the transmission cannot be performed to other antennas.

4. The base station according to claim 1, comprising a spread processor for performing spread processing of said transmission data separately for said plural antennas,
    wherein said transmission controller separates said transmission data and said transmission control signal and performs an output control of said corresponding spread processor in response to said separated transmission control signal for a corresponding antenna.

5. The base station according to claim 1, comprising a plurality of spread processors for performing the spread processing of said transmission data and output destination selector for freely selecting said antenna as an output destination of said spread processor;
  wherein said transmission controller separates said transmission data and said transmission control signal and performs an output control of said spread processor corresponding to an output destination that is selected by said output destination selector in response to the separated transmission control signal for a corresponding antenna.

6. A CDMA (Code Division Multiple Access) mobile communication system for performing a site selection diversity control during soft-handover that a base station having a plurality of antennas corresponding to sectors and a mobile terminal communicating to said base station perform communication through more than one sector,
  said base station comprising a transmission control signal generator for adding a transmission control signal showing if the transmission can be realized or not for said plural antennas to the transmission data; and
  a transmission controller for performing on-off control of said transmission data to said antennas in response to said transmission control signal,
  wherein said transmission control signal generator generates said transmission control signal for each symbol of said transmission data, respectively, and includes a multiplexer for time division multiplexing said symbol and said control signal corresponding to said symbol and outputting them.

7. The mobile communication system according to claim 6, wherein said mobile terminal measures a receiving quality of a transmission pilot signal from each of said antennas and said transmission control signal generator generates said transmission control signal according to said receiving quality.

8. The mobile communication system according to claim 7, wherein said control signal indicates that the transmission can be performed only to the antenna with the best receiving quality from among said antennas and the transmission cannot be performed to other antennas.

9. The mobile communication system according to claim 6, wherein said base station comprises a processor for spread processing of said transmission data separately for said plural antennas;
  wherein said transmission controller separates said transmission data and said transmission control signal and produces an output for controlling said corresponding spread processor in response to the separated transmission control signal for a corresponding antenna.

10. The mobile communication system according to claim 6, wherein said base station comprises a plurality of spread processors for spread processing of said transmission data and an output destination selector for freely selecting said antenna as the output destination of said spread processor;
  wherein said transmission controller separates said transmission data and said transmission control signal and produces an output for controlling said spread processor corresponding to the output destination that is selected by said output destination selector in response to the separated transmission control signal for a corresponding antenna.

* * * * *